Figure 1:
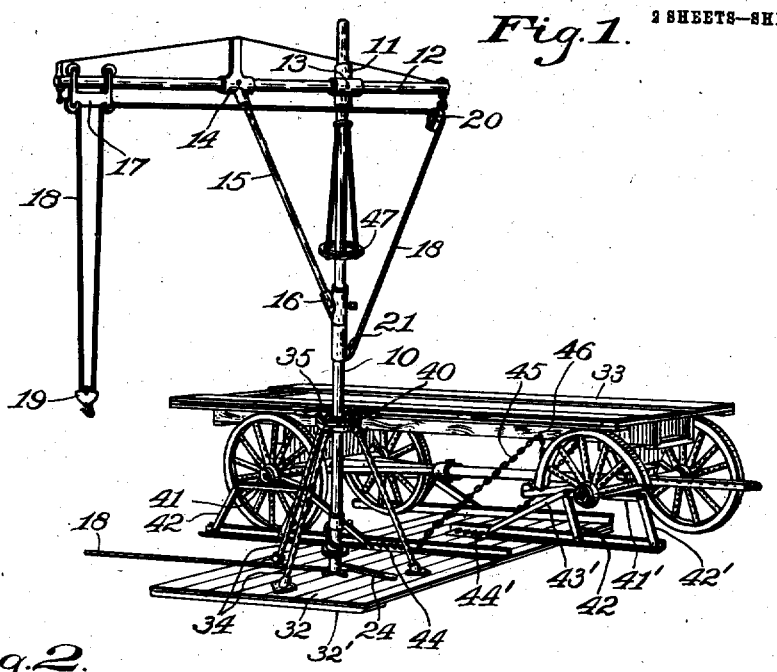

A. N. HADLEY.

PORTABLE FIELD DERRICK.

APPLICATION FILED JAN. 4, 1909.

Reissued May 25, 1909.

12,960.

2 SHEETS—SHEET 1.

WITNESSES:

J. A. Gardner.

K. R. Woddell.

INVENTOR:

Artemus N. Hadley,

BY

E. T. Silvius,

ATTORNEY.

THE NORRIS PETERS CO., WASHINGTON, D. C.

A. N. HADLEY.

PORTABLE FIELD DERRICK.

APPLICATION FILED JAN. 4, 1909.

Reissued May 25, 1909.

12,960.

2 SHEETS—SHEET 2.

WITNESSES:

J. H. Gardner.

K. R. Woddell.

INVENTOR:

Artemus N. Hadley,

BY

E. T. Silvius,

ATTORNEY.

THE NORRIS PETERS CO., WASHINGTON, D. C.

UNITED STATES PATENT OFFICE.

ARTEMUS N. HADLEY, OF INDIANAPOLIS, INDIANA.

PORTABLE FIELD-DERRICK.

No. 12,960. Specification of Reissued Letters Patent. Reissued May 25, 1909.

Original No. 871,500, dated November 19, 1907, Serial No. 189,619. Application for reissue filed January 4, 1909. Serial No. 470,738.

*To all whom it may concern:*

Be it known that I, ARTEMUS N. HADLEY, a citizen of the United States, residing at Indianapolis, in the county of Marion and State of Indiana, have invented certain new and useful Improvements in Portable Field-Derricks, of which the following is a specification.

An object of my invention is to produce a cheap, yet efficient portable device by means of which shocks of corn, other crops or material may be easily lifted from the ground to a vehicle, or vice versa, and so constructed that while the loaded vehicle is driven to a distant point to discharge its load, the apparatus may be left standing in the field and attached to another vehicle and used for loading the same, it being contemplated that the apparatus be easily transported from place to place by the vehicle to which it is attached.

A further and special object is to provide an improved derrick construction whereby the force of gravity may be utilized for swinging a load when supported by the derrick; and, also, to provide means whereby the angularity of a substantially vertical derrick mast may be adjusted to bring the mast either to a perpendicular position or to an angle thereto, so that when the supporting base of the mast is resting in a position where placed for use, whether level or not, the mast may be adjusted angularly with respect to its base, to obviate the necessity of adjusting the base, when portable, particularly to enable the mast to be placed perpendicularly if desired, or to be made to lean so that the load will swing by gravity in the direction toward which the mast may lean.

A still further object is to provide improved means whereby a rotary derrick mast may be mounted to move axially or downward by the force of gravity and cause rotary movement; to provide means whereby the rotary movement of the mast may be automatically stopped after swinging a load, and whereby the derrick may be prevented from swinging by force of gravity.

With the above-mentioned and minor objects in view, the invention consists in a derrick comprising a mast on which an arm is mounted for lifting and swinging a load, novel bearings supporting the mast so as to be rotatable and also angularly and axially movable, and means for adjusting the angularity of the mast relatively to the perpendicular. And, the invention consists further in the novel parts, and in the combinations and arrangements of parts, as hereinafter particularly described and pointed out in the accompanying claims.

Figure 2:
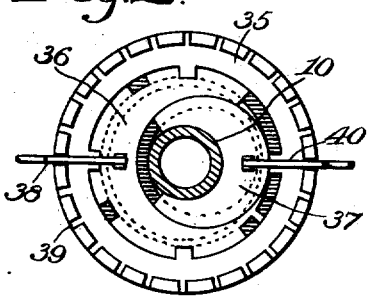
Figure 3:
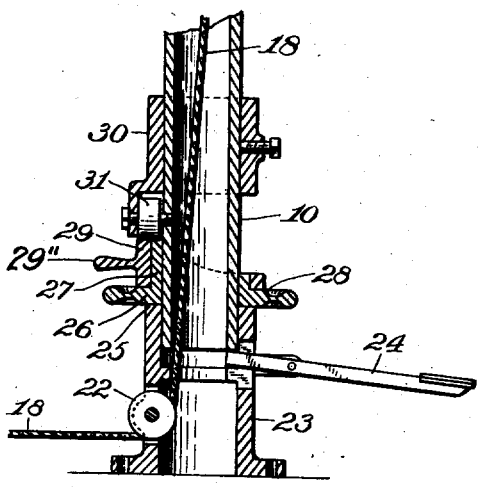
Figure 4:
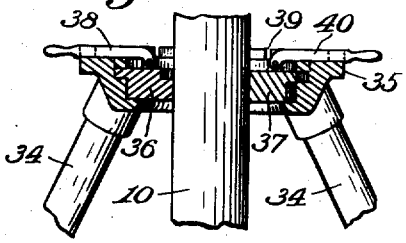
Figure 5:
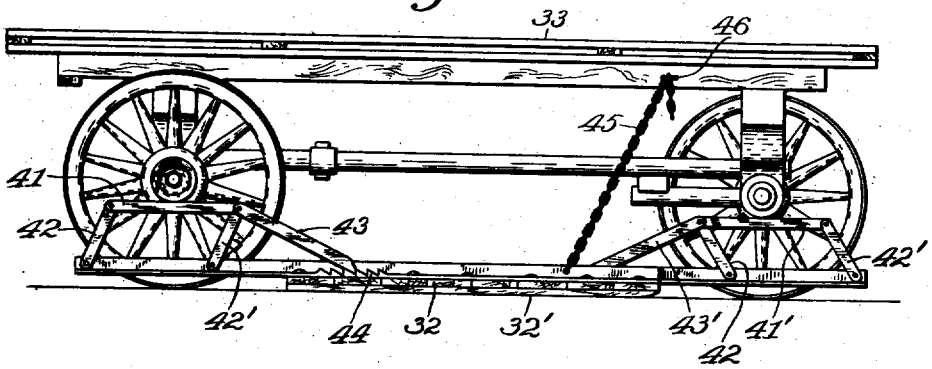
Figure 6:
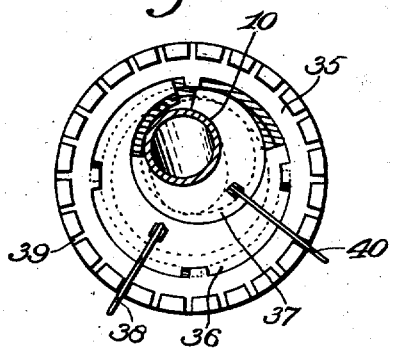
Figure 7:
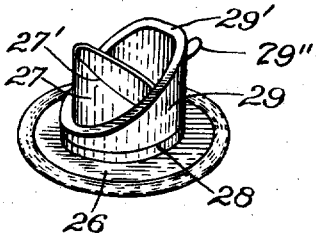

Referring to the drawings, forming parts of the specification, Figure 1 is a perspective view of one form of my apparatus. Fig. 2 is a plan of the apparatus for adjusting the angularity of and laterally supporting the mast, the latter being shown therewith in horizontal section and adjusted centrally of the apparatus. Fig. 3 is a detail vertical section of the apparatus for supporting the mast so as to be movable rotatively and axially, including the lower end of the mast. Fig. 4 is a detail vertical section of the apparatus for laterally supporting the mast and adjusting the angularity thereof. Fig. 5 is a side elevation of the platform for supporting the derrick, and a vehicle shown in position for assisting in holding the platform firmly. Fig. 6 is a plan of the apparatus shown in Fig. 2 with parts thereof in other positions to adjust the mast so as to lean. And, Fig. 7 is a perspective detail showing parts of the apparatus for supporting the mast so as to be movable axially and rotatably.

Similar reference characters in the drawings indicate like parts or features of construction referred to herein.

In the drawings, 10 indicates a suitable upright derrick mast to which is secured near its upper end a horizontal bearing member 11 through which is passed a cross-arm 12, said cross-arm being adjustable in the member and held in any desired position by a set-screw 13. Arm 12 passes also through a fitting 14 which is carried at the upper end of a diagonal bar 15 the lower end of which is stepped in a fitting 16 secured to the mast 10. Mounted upon one end of the cross-arm 12 is a suitable carriage 17 which is adapted to be rolled upon the cross-arm. Secured to the outer end of cross-arm 12 is one end of a cable 18 which passes from thence over a suitable guide or pulley carried by carriage 17, thence down through a block 19, thence up over a second suitable guide carried by carriage 17, from thence to a block 20 attached to the opposite end of arm 12, from thence downward over a suitable pulley 21 into the interior of mast 10 and thence downward and out at the lower end of mast 10 around a suitable pulley 22 mounted in a step-bearing 23 provided for the mast, the cable being thence passed preferably to the rear so that a horse or a draft device may be attached thereto. Mast 10 is stepped within the step-bearing 23 and is both rotatably and axially and also slightly angularly movable therein, a suitable foot-lever 24 engaging the lower end of mast 10 for a purpose which will appear. Resting upon the upper roughened end 25 of the step-bearing 23 is a rotatable collar 26 carrying a cam-shaped annular flange 27 which surrounds mast 10. Resting upon the upper roughened end 28 of collar 26 is a second collar 29 having a handle 29″ and extending about the flange 27 which is similarly cam-shaped to correspond with the flange 27. Secured to mast 10 is a fitting 30 which carries a horizontal roller 31 adapted to rest upon flange 27 and collar 29 and thus support the weight of the mast 10 and its attached parts. Step-bearing 23 is mounted upon a suitable platform 32 which is adapted to lie transversely beneath the vehicle 33, and erected on said platform 32 are suitable braces 34 which support a guiding ring 35 through which mast 10 extends. Rotatably mounted within ring 35 is a crescent 36, and rotatably mounted in crescent 36 is a second crescent 37 which embraces mast 10. Crescent 36 may be held to prevent rotation by a suitable latch 38 which may be thrown into any one of the notches 39 formed in ring 35, and crescent 37 may be similarly held in adjustment by means of a latch 40.

The cam-shaped flange 27 has an inclined top 27′ forming a track for the roller 31, so that the roller may move up one side and down the opposite side of the incline, or vice versa, and the collar 29 has also an inclined top 29′ to form a track for the roller, and in one adjustment the tracks may coincide, while in another adjustment (as in Fig. 7), two summits and two valleys may be formed, so that the roller may pass down either one of the tracks through a valley to the other track to be naturally arrested thereby.

The braces 34 and the ring 35 form a tripod or frame for lateral support of the mast, and it is obvious that the ring 35 may be supported otherwise than by means of the braces 34. The crescent 36 is substantially of the form of an eccentric-block, being convenient form for the purpose, and is employed for the purpose of determining the direction of angularity of the mast, the other crescent 37 or eccentric-block determining the amount of angularity, and at times the inner one of the crescents partially performs the function of the outer one. The latches 38 and 40 are of suitable form to serve as operating levers for adjusting the crescents rotatively. The mast 10 is so arranged in the crescent 37 that it may be moved not only rotatively and axially or in line with its rotary axis, but may be adjusted angularly in the crescent or so as to lean.

As previously stated, platform 32 is adapted to extend transversely beneath the vehicle 33, the arrangement being such that the wheels of the vehicle may pass over the platform when desired. In order to hold the platform and prevent the same from tipping while the vehicle is being loaded, I provide suitable bars 41 and 41′, each of which is supported upon the platform by means of parallel links 42 and 42′ and the bars may be thrown up into engagement with the vehicle, as for instance, the axles or hubs, by means of brace bars 43 and 43′, the lower end of each of which may take into a suitable ratchet 44 or 44′ carried by the platform 32. In order to transfer the mechanism easily, suitable chains 45 are attached to the platform 32 and are arranged to be inclined forward and attached to suitable eyes 46 secured to the bed of the wagon 33, the arrangement being such that when the wagon is started forward the chains 45 will have a tendency to lift the platform 32 slightly from the ground and drag it along beneath the wagon. Suitable runners 32′ are placed beneath the platform 32.

In order to enable the operator to intelligently use the adjusting crescents 36 and 37 in bringing the mast 10 to a substantially vertical position, I provide a plumbing ring 47 which is slightly larger than mast 10 and surrounds the same, and is suspended in position by three chains which are attached to mast 10 near its upper end.

In operation, wagon 33 is driven over platform 32 until it lies transversely beneath the wagon between the wheels. The chains 45 are then attached to eyes 46, said chains being of such length that, when the wagon starts forward the platform will not lag far enough behind to be caught by the rear wheels. The bars 41 and 41′ are then dropped and the apparatus is driven into the field. When it has arrived at a point near the shock to be lifted, the bars are thrown up into engagement with adjacent parts of the wagon, and crescents 36 and 37 are adjusted until mast 10 stands substantially plumb or in any desired angle as indicated by plumbing-ring 47. Collars 26 and 29 are then adjusted on the step-bearing 23 until the highest point thereof will lie in such position that roller 31 will be upon that point (as in Fig. 3) when the mast is swung so as to bring the lifting end of cross-beam 12 into position adjacent the shock to be lifted. The shock is then attached to block 19 and lifted by a proper pull upon cable 18. As soon as this is done a slight pull or shove upon the shock turns mast 10, and roller 31 rides down an incline formed by flange 27 and collar 29, the swing of the mast 10 being accomplished by the weight of the shock and the mast exerted on the incline and the swing being sufficient to throw the shock around over the wagon-bed upon which it may be readily deposited. The foot-lever 24 is convenient for lifting mast 10 in order that collars 26 and 29 may be readily adjusted. The apparatus may be moved from place to place until a load is obtained, whereupon chains 45 may be disconnected and the loaded wagon driven away from the platform, and while it is being driven to a point at which the load is to be discharged, another wagon may be driven into position over the platform and the operation repeated. By this means a single loading apparatus may be used with a number of wagons in succession.

In case it be desired that the gravity movement take place at other points than above-mentioned, the collars 26 and 29 will be adjusted otherwise as may be required; and, as will be apparent, the swinging of the load may be assisted by varying the angularity of the mast. When the collars are adjusted as in Fig. 7 the roller 31 may rest in a crotch formed thereby and prevent rotation of the mast by gravity.

In some cases the apparatus for adjusting the angularity of the mast may be employed alone for utilizing the force of gravity to swing the load, and also said apparatus may in some cases be dispensed with and the apparatus for producing axial movement of the mast be employed alone for the purpose described.

It will be readily understood that the form of platform 32 and the details of construction of the mast and lifting apparatus may be varied without departing from the broad spirit of my invention.

I claim as my invention,—

1. A derrick including a step-bearing, a substantially vertical mast supported to move angularly on the step-bearing, and means for adjusting the vertical angle of the mast.

2. A derrick including a step-bearing, a substantially vertical mast supported to move angularly on the step-bearing, means for adjusting the vertical angularity of the mast with respect to degree of angularity, and means for adjusting the vertical angularity of the mast with respect to direction of angularity.

3. A derrick including a step-bearing, a frame member suitably supported above the step-bearing, a substantially vertical mast supported to move angularly on the step-bearing and extending through the frame member, and means coöperating with the frame member and the mast for adjusting the vertical angularity of the mast with respect to degree and also direction of angularity.

4. A derrick including a bearing, a frame member comprising a guide and suitably supported above the bearing, a substantially vertical mast supported to move angularly on the bearing and extending through the guide, and a plurality of coöperating crescents suitably supported to rotate independently for adjusting the vertical angularity of the mast with respect to degree and also direction of angularity.

5. A derrick including a step bearing, a frame member comprising a guiding ring and suitably supported above the step-bearing, a substantially vertical mast supported to move angularly on the step-bearing and extending through the guiding ring, a main crescent mounted rotatably in the ring and provided with an operating lever, and a relatively smaller crescent mounted rotatively in the main crescent and embracing the mast.

6. A derrick including a suitable support and a substantially vertical mast mounted rotatably thereon and capable of axial movement thereon, adjustable means for normally producing rotary movement of the mast upon axial movement thereof, and adjustable means for limiting and varying the degree of rotary and axial movements of the mast.

7. A derrick including a step-bearing, a frame member comprising a guiding ring having notches therein and suitably supported fixedly above the step-bearing relatively thereto, a substantially vertical hollow mast supported to move angularly on the step-bearing and extending through the guiding ring, an arm mounted on the mast above the frame member, a lifting cable coöperating with the arm and extending through the mast, a main crescent mounted rotatably in the ring and provided with a combined lever and latch to enter either one of the notches, and a relatively smaller crescent mounted rotatively in the main crescent and embracing the mast, the smaller crescent being provided also with a combined lever and latch to enter either one of the notches.

8. In a loading apparatus, the combination with a mast and lifting apparatus carried thereby, of a self-supporting support for said mast adapted to project beneath a vehicle and over which the vehicle may run, and means for detachably connecting said support to the vehicle whereby it may be transported.

9. In a loading apparatus, the combination with a support adapted to extend beneath a wagon and rest upon the ground, of a mast supported on said support, lifting apparatus carried by said mast, and means carried by the support for engagement with the wagon, whereby the weight of the wagon may be applied to the support to prevent the same from tipping.

10. In a loading apparatus, the combination with a suitable support adapted to extend beneath a wagon, of a mast carried by the support, a lifting apparatus carried by said mast, braces carried by the support, and means for throwing said braces upward into engagement with the wagon, for the purpose set forth.

11. In a loading apparatus, the combination with a suitable support, and a substantially vertical mast rotatably mounted thereon, of a pair of cam-collars 27 and 29 surrounding said mast and supporting the same for the purpose set forth.

12. In a loading apparatus, the combination with a suitable support and a substantially vertical mast mounted rotatably thereon, and capable of both angular and axial movement thereon, of means for normally producing axial movement of the mast upon rotary movement thereof, and means for adjusting the vertical angle of the mast.

13. In a loading apparatus, the combination with a suitable support and a substantially vertical mast mounted rotatively thereon, and capable of both angular and axial movement thereon, of means for normally producing axial movement of the mast upon rotary movement thereof, and other means for engaging the mast and preventing axial movement thereof.

14. In a loading apparatus, the combination with a suitable support and a substantially vertical mast rotatably mounted thereon, of means for adjusting the vertical angle of said mast, and an annulus surrounding said mast and loosely suspended from an upper portion of the mast, whereby it will serve as an indicator to indicate the vertical position of the mast.

In witness whereof, I have hereunto set my hand and seal at Indianapolis, Indiana, in the presence of two witnesses.

ARTEMUS N. HADLEY. [L. S.]

Witnesses:
P. A. HAVELICK,
E. T. SILVIUS.